(12) United States Patent
Weston et al.

(10) Patent No.: US 10,718,596 B1
(45) Date of Patent: Jul. 21, 2020

(54) GPS EXTENSION FOR AN ARROW

(71) Applicants: Eric Weston, Vancouver, WA (US);
Kenneth Weston, Vancouver, WA (US)

(72) Inventors: Eric Weston, Vancouver, WA (US);
Kenneth Weston, Vancouver, WA (US)

(*) Notice: Subject to any disclaimer, the term of this patent is extended or adjusted under 35 U.S.C. 154(b) by 0 days.

(21) Appl. No.: 16/401,602

(22) Filed: May 2, 2019

(51) Int. Cl.
| F42B 6/04 | (2006.01) |
| F42B 12/36 | (2006.01) |
| F42B 6/02 | (2006.01) |
| H04W 4/80 | (2018.01) |
| G01S 19/24 | (2010.01) |
| G01S 19/19 | (2010.01) |
| F42B 12/38 | (2006.01) |

(52) U.S. Cl.
CPC ............ *F42B 12/362* (2013.01); *F42B 6/02* (2013.01); *F42B 6/04* (2013.01); *F42B 12/385* (2013.01); *G01S 19/19* (2013.01); *G01S 19/24* (2013.01); *H04W 4/80* (2018.02)

(58) Field of Classification Search
CPC .................................. F42B 6/04; F42B 12/385
See application file for complete search history.

(56) References Cited

U.S. PATENT DOCUMENTS

| D489,116 S | 4/2004 | Watson, Jr. et al. |
| 8,128,520 B2 | 3/2012 | Miner |
| 2011/0202152 A1* | 8/2011 | Barton ...................... F41B 5/14 700/91 |
| 2015/0312708 A1 | 10/2015 | Helmer |
| 2016/0091610 A1 | 3/2016 | Eggers |
| 2016/0282474 A1 | 9/2016 | Silvis |
| 2017/0241756 A1 | 8/2017 | White, Jr. et al. |
| 2017/0261295 A1* | 9/2017 | Emrich .............. A63B 24/0021 |

* cited by examiner

*Primary Examiner* — John A Ricci

(57) ABSTRACT

An arrow extension for providing GPS information of the location of an arrow is presented. The extension has a first end that has a receiving port for being coupled to an arrowhead. The extension has a power source for providing power to the extension. The power source has an actuator for changing a state of the power source. The power source also has a charging port for charging the power source. The extension has a GPS module, for determining a location and a transmitter/receiver for transmitting and receiving wireless signals. The wireless signals may be received by a device for displaying the location received in the wireless signal.

14 Claims, 3 Drawing Sheets

GPS EXTENSION FOR AN ARROW

FIELD OF THE INVENTION

This invention relates to wild game recovery. More particularly, it relates to GPS for recovering wild game.

BACKGROUND

Game or quarry is any animal hunted for sport or for food, and the meat of those animals. The type and range of animals hunted for food varies in different parts of the world.

Game or quarry is any animal hunted for its meat or for sport. The term game arises in medieval hunting terminology by the late 13th century and is particular to English, the word derived from the generic Old English gamen (Germanic *gamanan) "joy, amusement, sport, merriment".

Quarry in the generic meaning is early modern (first recorded 1610), in the more specific sense "bird targeted in falconry" late 14th and 15th centuries as quirre "entrails of deer placed on the hide and given to the hunting-dogs as a reward", from Old French cuiriee "spoil, quarry" (ultimately Latin corium "hide"), but influenced by corêe "viscera, entrails" (Late Latin *corata "entrails", from cor "heart").

Unlike many commercial meat products, the meat from wild animals (especially herbivores), when prepared correctly, is very healthy and nutrient-dense. This is primarily due to the animal's natural diet and healthy lifestyle. It can be virtually assured that the animal was never bred or raised in unsanitary conditions, fed a diet of grain, confined to a cage, or injected with any artificial hormones. On the other hand, the act of killing the animal for its meat is more apparent and can only be done within reasonable regulations to ensure continuity of the animal species and its meat resource.

Small game includes small animals, such as rabbits, pheasants, geese or ducks. Large game includes animals like deer, moose, and bear. Big game is a term sometimes used interchangeably with large game although in other contexts it refers to large, typically African, mammals (specifically "big five game" or "dangerous game") which are hunted mainly for trophies in safaris.

Once the game has been won, there is a need to recover the game from the field. There is a need to have a hunting device which eases the recovery and reduces the time to recover the game. When a target is missed, recovery of an arrow when bow hunting may be hard to find. Therefore, there is a need for an attachment to an arrow to ease in the recovery of the hunter's equipment.

DETAILED DESCRIPTION

Figure 1:
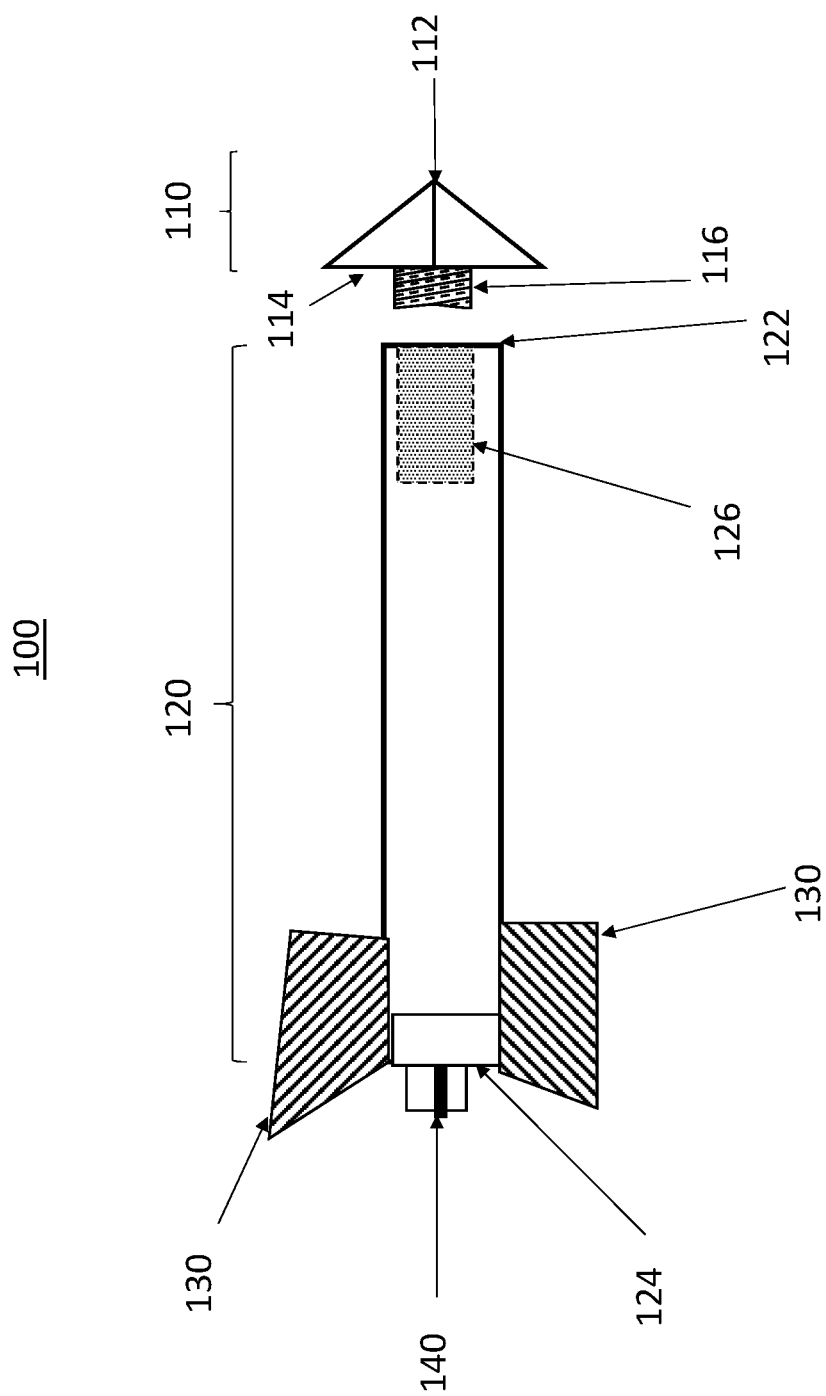
FIG. 1 is an illustrated view of an arrow used in bow hunting.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list. "Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 is an illustrated view of an arrow 100 used for bow hunting. The arrow 100 is useful for a safe and traditional method of hunting game. The arrow 100 is typically shot from a cross-bow or a bow.

The arrow 100 has an arrowhead 110, a shaft 120, a plurality of fetches 130 and a nock 140. The arrowhead 110 is useful for piercing the hid of a game when a hunter is bow hunting the game. The arrowhead 110 is made of a hardened material such as hard plastic, but may be made of stone, steel, aluminum, etc. The arrowhead 110 has a target point 112 and a connecting end 114. The arrowhead 110 has a male port 116. The male port 116 for coupling the arrowhead to a female end. The male port 116 of the arrowhead 110 preferably has screw-like grooves, but may have a clip coupling, a friction coupling, etc.

The shaft 120 is a long spine. The shaft is made of strong material such as wood, fiberglass, aluminum, carbon, etc. The spine is a degree of stiffness that is determined by matching with a bow that is being used by the hunter. The stiffness being resistance to ending. As the arrow 100 is released from the bow, the shaft 110 bends before straitening in flight. The shaft 120 has a forward end 122 and a back end 124. The forward end 122 of the shaft 120 is coupled to the connecting end 114 of the shaft. The shaft 120 has a receiving port 126 for coupling to the male port 116 of the arrowhead 110 of the arrow 100. The receiving port 126 is preferably receiving a screw male end, but may be a clip receiving port, a friction receiving port, etc.

The plurality of fletches are the vanes or feathers of the arrow 100. The fletches are typically made of plastic, but may be made from feathers, etc. The fletches create a wind drag which may cause the arrow 100 to spin providing stability to the flight of the arrow 100. The plurality of fletches are coupled to substantially near the back end 124 of the shaft 120 of the arrow 100.

The nock 130 is coupled to the back end 124 of the shaft 120 of the arrow 100. The nock 130 is typically a notched tip and holds the arrow 100 in position prior to being released from the bow. The nock 130 is typically made from a plastic material but may be made from other materials such as PVC, steel, aluminum, etc.

Figure 2:
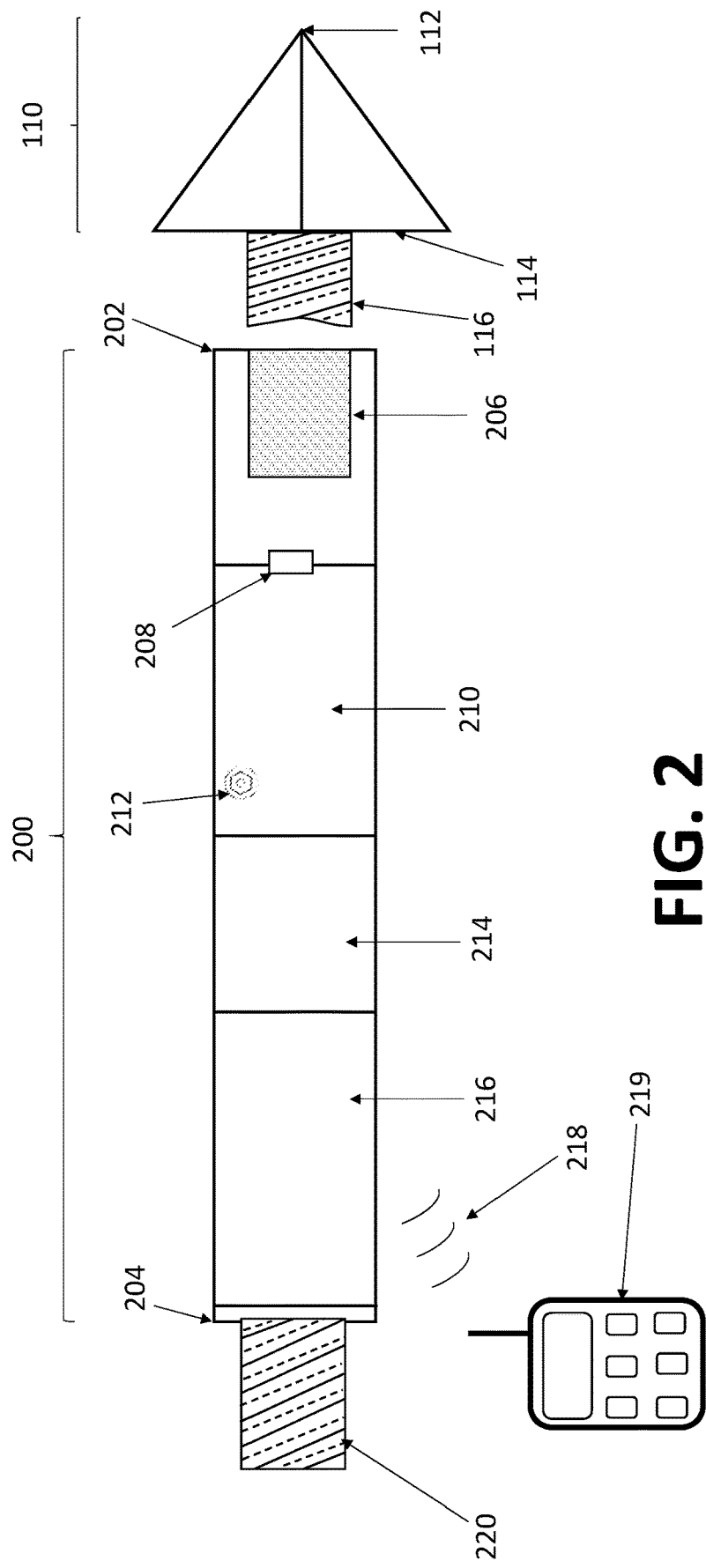
FIG. 2 is an illustrated view of an exemplary arrow extension.
Figure 3:
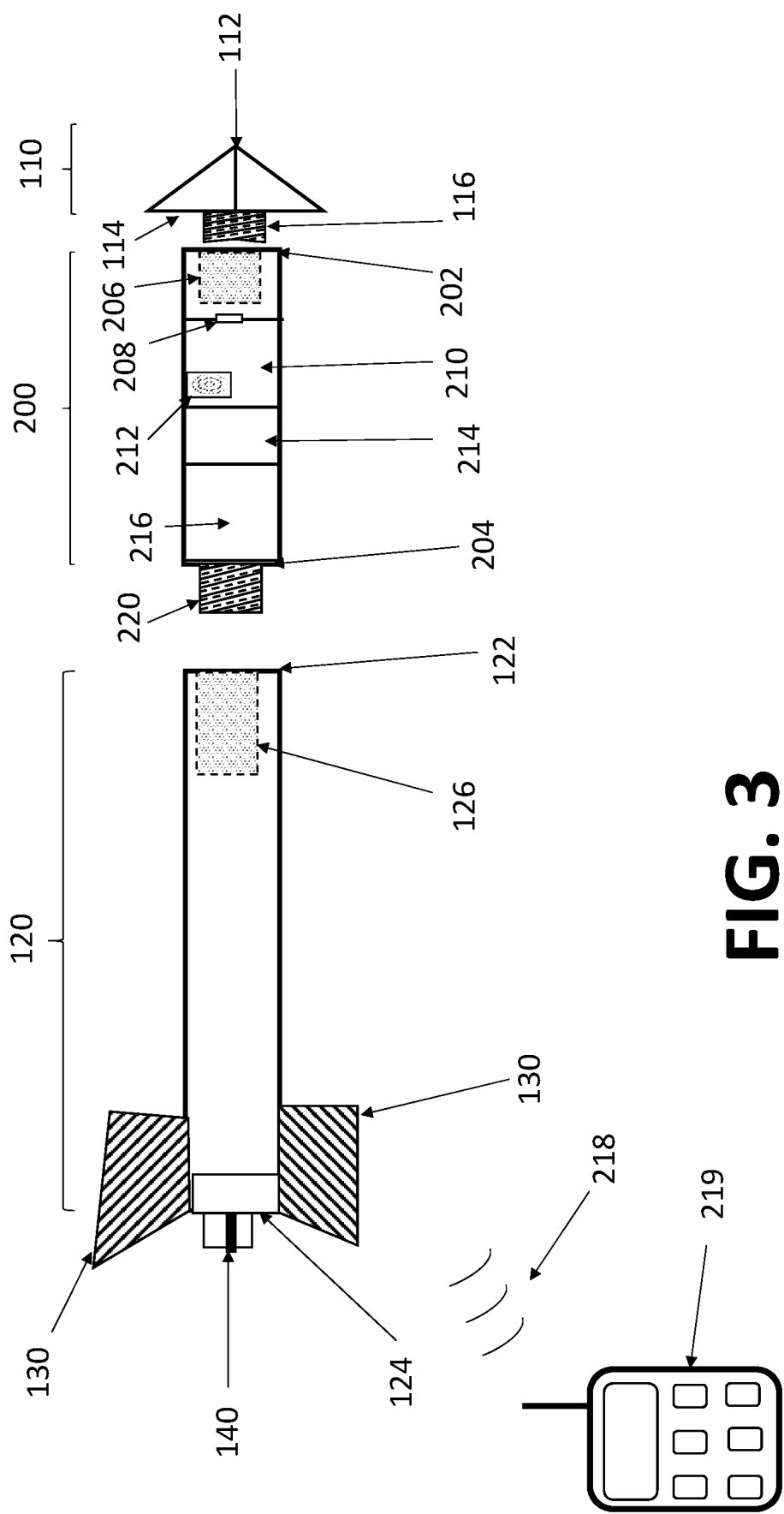
FIG. 3 is an illustrated view of the exemplary arrow extension of FIG. 2 coupled with the arrow of FIG. 1.

Referring to FIG. 2 and FIG. 3, an illustrated view of an arrow extension 200 in FIG. 2 and the arrow extension 200 coupling of to the arrow 100 in FIG. 3 is presented. The arrow extension 200 is useful for tracking an arrow when the hunter is bow hunting. The arrow extension 200 provides GPS coordinates and/or tracking to show where the arrow landed or if a target is hit and runs out, then it allows the hunter to track the game so that the hunter can recover the game in a quick manner which increases safety for the hunter. The arrow extension 200 preferably is made of an aluminum material, but may be made of other material such as polyethylene plastic, PCV, fiberglass, etc. The arrow extension 200 is preferably three (3) inches in length, but the length may be any length desired such as two (2) inches, four (4) inches, etc.

The arrow extension 200 has a first end 202, a second end 204, an receiving port 206, a charging port 208, a power source 210, an actuator 212, a GPS module 214, a transmitter/receiver 216 and a male port 220. The arrow extension 200 is useful for tracking and providing information about a location of an arrow if the arrow missed its target after being released. Further, if the target was hit by the arrow, the arrow extension 200 provides a location of the game that was hit after the arrow was released, as the location can change because the game runs out after being pierced by the arrow.

The first end 202 of the arrow extension 200 has the receiving port 206. The receiving port is preferably receiving a screw receiver, but may be a clip receiving port, a friction receiving port, etc. The receiving port 206 of the arrow extension 200 is configured to receive a male port from another portion of an arrow. The receiving port 206 is preferably recessed into the first end 202 of the arrow extension 200. The receiving port 206 of the arrow extension 200 receives the male port 116 of the connecting end 114 of the arrowhead 110 of the arrow 100.

The second end 204 of the arrow extension 200 has the male port 220. The male port 220 the arrow extension 200 preferably has screw-like grooves, but may have a clip coupling, a friction coupling, etc. The male port 220 of the second end 204 of the arrow extension 200 is extended from the second end 204 of the arrow extension 200. The male port 220 of the back end 124 of the arrow extension 200 is configured to couple into the receiving port 126 of the first end 122 of the shaft 120 of the arrow 100.

The power source 210 is configured substantially near the first end 202 of the arrow extension. The power source 210 is preferably a battery, but may be any source of power such as solar power, ac/dc, etc. The power source 210 is coupled to a charging port 208. The charging port 208 is useful for charging the power source 210 when the power source 210 is rechargeable. The charging port 208 is preferably a USB 2.0 port, but may be any other type of port for charging such as USB 3.0, USB-b (mini), USB type-c, etc.

The power source 210 is controlled by the actuator 212. The actuator 212 is in communicatively coupled to the power source 210. The actuator 212 is preferably a push button, but may be any type of actuator such as a toggle switch, wireless controlled, etc. The actuator 212 is useful for changing the state of the power source 210, that being turning the power source 210 to an "off" state when it was previously in an "on" state, and/or changing the power source 210 to an "on" state when the previous state was "off".

The GPS module 214 is preferably a System on a Chip (SoC), but may be a standalone module with a separate transmitting and receiving device 216. The GPS module 214 is useful for determining the location of the arrow, whether on a miss fire or if the arrow 100 had hit its target. The transmitter/receiver 216 is useful for sending wireless signals 218 to alert a device 219 of the location of the arrow 100. If the GPS module is contained on a SoC, the transmitter/receiver may be collocated on the SoC with the GPS module. The device 219 is preferably a smart phone, but may be other devices capable of receiving and displaying GPS information. The wireless signals 218 is preferably Bluetooth, but may be any other type of signal such as 4G cellular, 5G cellular, etc. The device 219 may display the received GPS information when received in the wireless signal 218. The device 219 may have an app (not shown) which provides a storage and display for the GPS information received in the wireless signal 218.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An arrow extension for providing GPS information of the location of an arrow, the extension comprising:
   a first end, the first end having a receiving port, the receiving port being coupled to an arrow head;
   a power source, wherein the power source being for providing power to the extension;
   an actuator, wherein the actuator coupled to the power source and where the actuator for changing a state of the power source;
   a charging port, wherein the charging port being coupled to the power source, and wherein the charging port being for charging the power source;
   a GPS module, wherein the GPS module is coupled to the power source and wherein the GPS module being for determining a location; and
   a transmitter/receiver, wherein the transmitter/receiver being coupled to the GPS module, wherein the transmitter/receiver being for transmitting and receiving wireless signals, and wherein the transmitter/receiver being separate from the GPS module, wherein the transmitter/receiver being for transmitting and receiving wireless signals, and wherein the wireless signals being IEEE 802.15 (Bluetooth®); and
   a device, wherein the device for receiving the wireless signal, and wherein the device being for displaying the location received in the wireless signal.

2. The arrow extension of claim 1, wherein the arrow extension being made of aluminum.

3. The arrow extension of claim 2, wherein the arrowhead having a male port, the male port having screw-like grooves.

4. The arrow extension of claim 1, wherein the receiving port of the arrow extension being screw-like grooves.

5. The arrow extension of claim 1, wherein the charging port being USB-type C.

6. The arrow extension of claim 1, further comprising the receiving port of the arrow extension being coupled to a male port of an arrowhead of the arrow; and
    the male port of the arrowhead being coupled to a receiving port of a shaft of the arrow.

7. The arrow extension of claim 1, wherein the power source being a battery.

8. The arrow extension of claim 7, wherein the battery being rechargeable.

9. The arrow extension of claim 1, wherein the actuator being a button.

10. The arrow extension of claim 1, wherein the device receiving the wireless signal being a smart phone.

11. The arrow extension of claim 1, wherein wireless signal being Bluetooth.

12. The arrow extension of claim 1, wherein the GPS module being a System on a Chip (SoC).

13. The arrow extension of claim 12, wherein the transmitter/receiver being collocated with the GPS module on the SoC.

14. The arrow extension of claim 1, wherein the arrow extension being three (3) inches in length.

* * * * *